United States Patent [19]

Kitamura et al.

[11] 4,272,622
[45] Jun. 9, 1981

[54] METHOD FOR PREVENTING POLYMER SCALE DEPOSITION IN THE POLYMERIZATION OF AN ETHYLENICALLY UNSATURATED MONOMER IN AN AQUEOUS MEDIUM

[75] Inventors: Hajime Kitamura, Ichihara; Toshihide Shimizu, Chiba; Ichiro Kaneko, Ibaraki, all of Japan

[73] Assignee: Shin-Etsu Chemical Co., Ltd., Tokyo, Japan

[21] Appl. No.: 149,414

[22] Filed: May 13, 1980

[30] Foreign Application Priority Data

May 22, 1979 [JP] Japan .................................. 54-62780
May 25, 1979 [JP] Japan .................................. 54-64765

[51] Int. Cl.³ .......................... C08F 2/18; C08F 2/22; C08F 2/20; C08F 2/24
[52] U.S. Cl. ................................. 526/62; 526/344.2; 526/346; 526/342
[58] Field of Search ......................................... 526/62

[56] References Cited

U.S. PATENT DOCUMENTS 3,669,946   6/1972   Koyanagi et al. ..................... 526/62

*Primary Examiner*—Stanford M. Levin
*Attorney, Agent, or Firm*—Toren, McGeady and Stanger

[57] ABSTRACT

The invention provides a novel method for preventing polymer scale deposition on the reactor walls in the polymerization of vinyl chloride, vinylidene chloride, styrene and other ethylenically unsaturated monomers in an aqueous medium. The inventive method comprises coating the reactor walls, piror to polymerization, with an aqueous coating solution containing a water-soluble ionic polymer and a water-soluble ionic dye having counteractive polarity to the polarity of the water-soluble ionic polymer compound. In other words, a water-soluble anionic dye is used as combined with a water-soluble cationic polymer and a water-soluble cationic dye is used as combined with a water-soluble anionic polymer compound. The scale preventing effect obtained with the combined use of the above two components can be further increased when the aqueous coating solution is admixed with a monovalent alcohol having from 3 to 6 carbon atoms in a molecule owing to the improved spreading of the aqueous solution on the metal surface of the reactor walls. The effect of the method is so remarkable and reliable that polymerization of styrene and other monomers can be performed in a stainless steel polymerization reactor, said polymerization being hitherto conducted in a glass-lined reactor due to the lack of an efficient method for preventing polymer scale deposition on the stainless steel surfaces.

8 Claims, No Drawings

METHOD FOR PREVENTING POLYMER SCALE DEPOSITION IN THE POLYMERIZATION OF AN ETHYLENICALLY UNSATURATED MONOMER IN AN AQUEOUS MEDIUM

BACKGROUND OF THE INVENTION

The present invention relates to a method for preventing polymer scale deposition on reactor walls in the polymerization of an ethylenically unsaturated monomer in an aqueous medium.

Ethylenically unsaturated monomers are polymerized in several different ways including suspension or emulsion polymerization in an aqueous medium, solution polymerization, gas-phase polymerization and bulk polymerization according to the kind of the monomer and the desired properties of the polymer. Among the above named methods of polymerization, several monomers are almost exclusively polymerized in an aqueous medium. Examples of such monomers are vinyl chloride, vinylidene chloride and styrene.

Not only the suspension and emulsion polymerizations but also any other polymerization processes suffer from the problem of polymer scale deposition on the walls of the polymerization reactor and other surfaces of the reactor coming into contact with the monomer as one of the most difficult problems in the industrial production of polymer products.

The polymer scale deposition on the reactor walls must be prevented as completely as possible because not only of the decrease in the yield of the polymer product and lowering of the cooling capacity of the reactor but also of the degraded quality of the polymer product due to the intermingled fragments of the polymer scale in the product coming off the reactor walls. Further, the works of removing polymer scale require much time and labor with consequently decreased productivity and increased production costs of the polymer products. What is worse, unreacted monomers are included in a large amount in the polymer scale and the workers undertaking the removal of the scale are exposed to the vapor of the monomer which is very dangerous due to its toxicity to the human health.

Various attempts have been proposed hitherto for reducing the amount of polymer scale deposition on the reactor walls. For example, polymer scale deposition on the reactor walls in the aqueous suspension polymerization of vinyl chloride can be reduced by coating the reactor walls, prior to polymerizaion, with a polar organic compound such as amine compounds, quinone compounds, aldehyde compounds and the like or an organic dye (see, for example, U.S. Pat. No. 3,669,946). This method is considerably effective in preventing polymer scale deposition but the problem in the method is the use of an organic solvent to dissolve the organic compound or the dye which is not or sparingly soluble in water in order to obtain a coating solution. Needless to say, the use of an organic solvent is undesirable due to the toxicity to the human body as well as the danger of fire or explosion. When the organic solvent is replaced with water instead of the organic solvent, if it is ever possible, the expected effect of polymer scale prevention is largely reduced to an impractically low level.

Further, the effectiveness of the above described method is considerably durable when the polymerization of vinyl chloride is carried out as suspension polymerization but, when the polymerization medium contains an emulsifying agent such as in the emulsion polymerization or in the combined use of an emulsifying agent with a suspending agent, effectiveness of the coating method is limited and not durable.

Furthermore, there has been proposed no promising method for preventing polymer scale deposition in the polymerization of styrene or copolymerization of styrene and butadiene or styrene, acrylonitrile and butadiene, for example, in an aqueous medium. Therefore, these polymerization procedures are conducted in a glass-lined polymerization reactor in contrast to stainless steel-made reactors widely used for the polymerization of vinyl chloride in an aqueous medium. Several of the problems in a glass-lined polymerization reactor are that the heat transfer coefficient of the glass-lined reactor walls is much lower than the walls of stainless steel reactors bringing about difficulties in effectively controlling the temperature, that glass-lined walls are susceptible to mechanical damage or fracture resulting in shorter life of the vessel and that a large-size reactor is hardly obtained due to the difficulty in fabrication despite the advantage that the glass-lined surface is less susceptible to the polymer scale deposition than the stainless steel surfaces.

One of the reasons for the relative ineffectiveness of aqueous coating solutions used for the purpose on stainless steel surfaces is that, due to the remarkably large surface tension of the aqueous solution, the coating solution cannot spread uniformly over the surface since metal surfaces are more or less repellent to aqueous solutions. Addition of a surface active agent to the aqueous coating solution is effective in improving the spreading of the solution on a metal surface but surface active agents generally increase the polymer scale deposition contrary to the object of coating.

Accordingly, there has been eagerly desired to develop a novel method for the prevention of polymer scale deposition on the reactor walls which is effective not only in the suspension polymerization of vinyl chloride but also in the polymerization of different types of vinyl chloride as well as in the polymerization or copolymerization of monomer or monomers other than vinyl chloride in an aqueous medium and in which no organic solvent is used for the preparation of the coating solution to be applied on to the reactor walls.

SUMMARY OF THE INVENTION

It is therefore an object of the present invention to provide a novel and improved method for preventing polymer scale deposition on the reactor walls not only in the aqueous suspension polymerization of vinyl chloride but also in the emulsion polymerization of vinyl chloride as well as polymerization and copolymerization of monomers other than vinyl chloride in an aqueous medium.

Another object of the present invention is to provide a method for preventing polymer scale deposition in the above mentioned types of polymerization by providing a coating layer on the reactor walls prior to polymerization, in which the coating layer is formed by use of an aqueous coating solution so as to be freed from the problems in the prior art method using organic coating solutions.

Thus, the method of the invention which is directed to the prevention of polymer scale deposition on the reactor surfaces coming into contact with the monomer or monomers in the polymerization of an ethylenically unsaturated monomer or monomers in an aqueous polymerization medium comprises coating the reactor surface with an aqueous coating solution containing, as dissolved therein, (a) a water-soluble ionic polymer compound, either cationic or anionic, and (b) a water-soluble ionic dye having counteractive polarity to the polarity of the said ionic polymer compound followed by drying. That is, when the water-soluble ionic polymer compound is cationic, the water-soluble dye should be anionic while a water-soluble anionic polymer compound should be used in combination with a water-soluble cationic dye.

In a further improved embodiment of the above described inventive method, the aqueous coating solution is admixed with an aliphatic monovalent lower alchohol having from 3 to 6 carbon atoms in a molecule so as that the spreadability or wettability of the solution on metal surfaces of the polymerization reactor can be improved.

DETAILED DESCRIPTION OF THE PREFERRED EMBODIMENTS

In the above described method of the present invention, the component (a) contained in the aqueous coating solution is a water-soluble ionic polymer compound which may be either cationic or anionic.

The water-soluble cationic polymer compounds as a class of the component (a) on one side are exemplified by those cationic polymer electrolytes containing nitrogen atoms in the main chain or as pendant groups to the polymer main chain where the nitrogen atoms are positively charged or polarized. Examples of such polymers are: polyethyleneimines; polyvinylamines; polyacrylamides; copolymers of N-vinyl-2-pyrrolidone and acrylamide; cyclic polymers of dimethyldiamylammonium chloride; cyclic polymers of dimethyldiethylammonium bromide; cyclic polymers of diallylamine hydrochloride; cyclic copolymers of dimethyldiallylammonium chloride and sulfur dioxide; polyvinyl pyridines; polyvinylpyrrolidones; polyvinylcarbazoles; polyvinylimidazolines; poly(dimethylaminoethyl acrylates); poly(dimethylaminoethyl methacrylates); poly(diethylaminoethyl acrylates); poly(diethylaminoethyl methacrylates) and the like.

The water-soluble anionic polymer compounds as the other class of the component (a) on the other side are exemplified by those anionic polymer electrolytes having salt structures of carboxylates or sulfonates with alkali metal ions or ammonium ions in the pendant groups. Examples of such polymers are: sulfomethylated polyacrylamides; sodium polyacrylates; sodium alginates; copolymers of acrylamide and sodium vinylsulfonates; sodium polymethacrylates; sodium polystyrenesulfonates; sodium polyethylenesulfonates; sodium ligninsulfonates; sodium chondroitin sulfonates and the like.

The water-soluble ionic dyes as the component (b) in the aqueous coating solution used in the inventive method are also divided into two classes of anionic ones and cationic ones. As is mentioned before, the water-soluble anionic dyes are used as combined with the water-soluble cationic polymer compound whereas the water-soluble cationic dyes are used as combined with the water-soluble anionic polymer compound.

The water-soluble anionic dyes suitable for use belong to several classes such as water-soluble azo dyes, water-soluble anthraquinone dyes, water-soluble triarylmethane dyes, water-soluble xanthene dyes, water-soluble azine dyes, water-soluble quinoline dyes, water-soluble nitro dyes, water-soluble phthalocyanine dyes and the like.

Particular examples of the water-soluble anionic dyes belonging to each of the above mentioned classes are as follows.

Water-soluble azo dyes: C.I. Acid Orange 7; C.I. Acid Red 37; C.I. Acid Red 264; C.I. Acid Blue 1.13; C.I. Acid Black 1; C.I. Acid Yellow 42; C.I. Acid Blue 158; C.I. Acid Green 12; C.I. Acid Orange 97; C.I. Acid Black 124; C.I. Direct Yellow 50; C.I. Direct Red 37; C.I. Direct Red 2; C.I. Direct Violet 12; C.I. Direct Blue 1; C.I. Direct Brown 1; C.I. Direct Black 77; C.I. Direct Green 1; C.I. Direct Orange 26; C.I. Direct Red 79; C.I. Direct Red 31; C.I. Direct Black 32; C.I. Direct Yellow 12; C.I. Direct Orange 41; C.I. Direct Red 113; C.I. Direct Yellow 28; C.I. Direct Green 26; C.I. Direct Red 81; C.I. Direct Violet 51; C.I. Direct Blue 71; C.I. Direct Brown 37; and C.I. Direct Black 19

Water-soluble anthraquinone dyes: C.I. Acid Blue 40; C.I. Acid Red 80; and C.I. Acid Green 41

Water-soluble triarylmethane dyes: C.I. Acid Blue 1; C.I. Acid Violet 17; and C.I. Acid Green 16

Water-soluble xanthene dyes: C.I. Acid Red 87; and C.I. Acid Red 52

Water-soluble azine dyes: C.I. Acid Blue 59; and C.I. Acid Black 2

Water-soluble quinoline dyes: C.I. Acid Yellow 3; and C.I. Acid Yellow 7

Water-soluble nitro dyes: C.I. Acid orange 3; and C.I. Acid Yellow 1

Water-soluble phthalocyanine dyes: C.I. Direct Blue 86

The water-soluble cationic dyes suitable for use in the inventive method are exemplified by water-soluble azine dyes, e.g. C.I. Basic Red 2, C.I. Basic Blue 16 and C.I. Basic Black 2; water-soluble acrydine dyes, e.g. C.I. Basic Orange 14, and C.I. Basic Orange 15; water-soluble triphenylmethane dyes, e.g. C.I. Basic Blue 1, C.I. Basic Violet 3, C.I. Basic Blue 26, C.I. Basic Violet 14, C.I. Basic Blue 5 and C.I. Basic Blue 7; water-soluble thiazine dyes, e.g. C.I. Basic Blue 9, C.I. Basic Yellow 1, C.I. Basic Blue 24, C.I. Basic Blue 25 and C.I. Basic Green 5; water-soluble methine dyes, e.g. C.I. Basic Red 12 and C.I. Basic Yellow 11; water-soluble diphenylmethane dyes, e.g. C.I. Basic Yellow 2; water-soluble xanthene dyes, e.g. C.I. Basic Violet 10 and C.I. Basic Red 1; water-soluble azo dyes, e.g. C.I. Basic Orange 2 and C.I. Basic Brown 1; and water-soluble oxazine dyes, e.g. C.I. Basic Blue 12 and C.I. Basic Blue 6.

The above described components (a) and (b) have desirably good or moderate solubility in water but they are not required to be highly water-soluble. A compound having a solubility in water of 0.1% by weight or larger can be used suitably for the preparation of the aqueous coating solution.

The weight ratio of the individual components (a) and (b) in the aqueous coating solution is of some importance in order to obtain highest effect of scale prevention. For example, the weight ratio of the component (a) to the component (b) is preferably in the range from 100:5 to 100:100 or, more preferably, from 100:15 to 100:50. When the amount of the component (b) relative to the amount of the component (a) is in excess over the above defined range, solid precipitates may sometimes be formed so that no satisfactory coating solution is obtained.

The concentrations of the components (a) and (b) in the aqueous coating solution is not particularly limitative. It should be noted, however, that the total concentration of the components (a) and (b) is desirably at least 0.01% by weight since, as a matter of course, satisfactory results are not obtained by coating the reactor surfaces with a coating solution too low in the concentrations of the components (a) and (b). On the other hand, no upper limit is given for the concentrations of these components in the coating solution and a solution of any high concentration can be used if the disadvantages accompanying the use of a coating solution of high concentration is disregarded that no particular additional advantages are obtained leading to lowered economy and that, instead, some inconvenience is caused in the application of the coating solution on to the reactor surfaces. Therefore, it is recommended that the total concentration of the components (a) and (b) in the coating solution does not exceed 5% by weight.

The aqueous coating solution used in the inventive method is readily prepared by merely disolving the components (a) and (b) in water in the concentrations and in the weight ratio as described above. The thus prepared aqueous coating solution can be applied as such on to the surface of the inner walls of a polymerization reactor made of, for example, stainless steel followed by drying to fully exhibit the desired effect of polymer scale prevention. It is of course that the surfaces should have been cleaned in advance as far as possible by a conventional method in order to ensure uniform coating with the coating solution. The means for coating is not limitative including spraying, brushing and other conventional methods. The amount of coating is preferably at least 0.001 g/m² as dried to have fully exhibited effects of polymer scale prevention.

The reactor surfaces coated with the aqueous coating solution are then dried. The wet surfaces are conveniently and rapidly dried by blowing with hot air heated at 40° to 100° C. Alternatively, the reactor surfaces are heated in advance at 40° to 100° C. by a suitable means and the aqueous coating solution is directly applied on to the heated surface so as that coating is followed by drying. After completion of drying, the coated surface is preferably rinsed with water to remove any dissolvable matter leaving the coating films insolubilized by drying.

It is optional that, if convenient and permissible, the reactor surface to be coated with aqueous coating solution in accordance with the present invention is undercoated in advance by a conventional coating solution used for the purpose of polymer scale prevention. Such an undercoating treatment is sometimes advisable when further improvement is desired for the reliability and durability of the coating films formed with the aqueous coating solution according to the invention to be effective in a number of repeated polymerization runs.

In applying the aqueous coating solution containing the components (a) and (b) as described above, however, difficulties are sometimes encountered in obtaining uniform and even spreading of the solution on the surface of, for example, stainless steel due to the high surface tension of the aqueous solution and poor affinity of the metal surface to the aqueous solution. A conventional way of decreasing the surface tension of an aqueous solution is to add a surface active agent to the solution. The addition of a surface active agent is, however, undesirable in this case since the presence of a surface active agent in the coating films on the reactor surfaces rather increases the polymer scale deposition contrary to the object of the inventive method.

The investigations undertaken by the inventors led to the discovery that the above difficulties could be overcome by admixing the aqueous coating solution with a small amount of an aliphatic monovalent lower alcohol having from 3 to 6 carbon atoms in a molecule. Examples of such alcohol compounds are n-propyl alcohol, isopropyl alcohol, n-butyl alcohol, isobutyl alcohol, sec-butyl alcohol, tert-butyl alcohol, n-amyl acohol, tert-amyl alcohol, isoamyl alcohol, sec-amyl alcohol, sec-hexyl alcohol and the like. They are used either singly or as a mixture of two kinds or more. The concentration of the alcohol compound in the aqueous coating solution is desirably at least 1% by weight in order to obtain the desired effect to a significant extent while the upper limit of the concentration is not particularly limitative but usually not exceeding 20% by weight. It is optional to use an organic solvent readily miscible with water such as ester solvents and ketone solvents in combination with the alcohol in a limited amount.

The aqueous coating solution thus admixed with the alcohol is applied on to the reactor surfaces and dried just in the same manner as in the case of the coating solution without the addition of the alcohol. After completion of coating with the aqueous coating solution and drying, the polymerization run is undertaken in the thus treated polymerization reactor.

The procedure of the polymerization run per se is not particularly different from conventional runs and the reactor having the surfaces of the wall and other parts coming into contact with the monomer or monomers coated and dried as described above is charged with water as the aqueous polymerization medium, monomer or monomers, polymerization initiators and other ingredients to start the polymerization run.

For example, addition of an alkaline substance into the polymerization mixture is effective for reducing the polymer scale deposition particularly for the polymerization of vinyl chloride in an aqueous medium as is well known in the art. Such an alkaline substance is exemplified by water-soluble compounds of alkali metals or alkaline earth metals including hydroxides, carbonates, hydrogencarbonates, silicates and acetates although the amount of such an alkaline substance should be limited not to adversely affect the properties of the polymer products.

As is mentioned before, the method of the present invention is very effective for various types of polymerization including not only suspension polymerization of vinyl chloride but also emulsion polymerization of vinyl chloride and polymerization of other ethylenically unsaturated monomers in an aqueous medium. For example, the effectiveness of the inventive method is not affected by the presence of an emulsifying agent in the aqueous polymerization mixture such as sodium laurylsulfate, sodium dodecylbenzenesulfonate, sodium dioctylsulfosuccinate and the like belonging to the class of anionic surface active agents and sorbitan monolaurate, polyoxyethylene alkyl ethers and the like belonging to the class of non-ionic surface active agents. Furthermore, the effectiveness of the inventive method is relatively insusceptible to the influence of the kinds of the other ingredients such as suspending agents and polymerization initiators as well as several optional additive ingredients such as fillers, stabilizers, lubricants, chain transfer agents, plasticizers and the like.

A diversity of ethylenically unsaturated monomers can be polymerized in an aqueous medium with no or little depostion of polymer scale on the reactor surfaces treated in accordance with the inventive method. The monomers applicable include vinyl halides such as vinyl chloride, vinyl esters such as vinyl acetate and vinyl propionate, acrylic acid and methacrylic acid and esters and salts thereof, maleic acid and fumaric acid and esters thereof, maleic anhydride, dienic monomers such as butadiene, chloroprene and isoprene, aromatic vinyl compounds such as styrene, unsaturated nitriles such as acrylonitrile, vinylidene halides such as vinylidene chloride and vinyl ethers such as vinyl ethyl ether. The method of the present invention is particularly effective for the suspension polymerization or emulsion polymerization of vinyl halides such as vinyl chloride and/or vinylidene halides such as vinylidene chloride or copolymerization of a monomer mixture mainly composed of the vinyl halides and/or vinylidene halides.

In addition, the method of the present invention is applicable to the polymerization of styrene, methyl methacrylate and acrylonitrile in an aqueous medium as well as to the emulsion polymerization for the preparation of latices of synthetic rubbers such as SBR, NBR, CR, IR and IIR or ABS resins in a stainless steel polymerization reactor, which polymerizations being performed hitherto in glass-lined polymerization reactors due to the lack of an effective means for preventing scale deposition on the inner walls of a stainless steel polymerization reactor.

Following are the examples to illustrate the method of the present invention in further detail.

EXAMPLE 1

Experiments No. 1 to No. 10)

Aqueous coating solutions were prepared each by dissolving a water-soluble cationic polymer compound as the component (a) and a water-soluble anionic dye as the component (b) of the kinds as indicated in Table 1 below in water. The amounts of the components (a) and (b) in each of the solutions were such that the total concentration of them was about 0.1% by weight, the weight ratio of the component (a) to the component (b) being as indicated in Table 1. In Experiments No. 5 to No. 10, the aqueous coating solution was admixed with an alcohol compound of the kind indicated in the table in an amount also given in the same table. The amount of addition of the alcohol given by parts by weight is per 100 parts by weight of the aqueous solution containing the components (a) and (b) as dissolved therein.

The thus prepared aqueous coating solution was applied by spray coating on to the surfaces of the inner walls of a polymerization reactor of 100 liter capacity and the stirrer thereof coming into contact with the monomer during the polymerization in a coating amount of 0.1–1.0 g/m$^2$ as dried followed by drying with heating at 50° C. for 15 minutes and washing with water.

Into the thus treated polymerization reactor were introduced 26 kg of vinyl chloride monomer, 52 kg of deionized water, 26 g of a partially saponified polyvinyl alcohol and 8 g of α,α'-dimethylvaleronitrile and polymerization was conducted at 57° C. for 10 hours with agitation.

TABLE 1

| Exp. No. | Water-soluble cationic polymer compound [Component (a)] | Water-soluble anionic dye [Component (b)] | (a)/(b) weight ratio | Alcohol compound, amount of addition in parts by weight | Amount of polymer scale deposition, g/m$^2$ |
|---|---|---|---|---|---|
| 1 | None | None | — | None | 1200 |
| 2 | Polyethyleneimine (degree of polymerization 1000) | None | 100/0 | None | 800 |
| 3 | None | C.I. Acid Black 2 | 0/100 | None | 1000 |
| 4 | Polyethyleneimine (degree of polymerization 1000) | C.I. Acid Black 2 | 100/30 | None | 10 |
| 5 | Polyethyleneimine (degree of polymerizatin 1000) | C.I. Acid Black 2 | 100/30 | Isobutyl alcohol, 5.0 | 0 |
| 6 | Polyethyleneimine (degree of polymerization 1000) | C.I. Acid Orange 7 | 100/50 | Isobutyl alcohol, 5.0 | 2 |
| 7 | Polyvinylpyrrolidone (degree of polymerization 700) | C.I. Direct Blue 71 | 100/15 | Isoamyl alcohol, 3.0 | 1 |
| 8 | Polyvinylpyrrolidone (degree of polymerization 700) | C.I. Direct Brown 1 | 100/40 | Isoamyl alcohol, 3.0 | 0 |
| 9 | Polyacrylamide (degree of polymerization 400) | C.I. Acid Yellow 7 | 100/20 | Isopropyl alcohol, 10.0 | 2 |
| 10 | Polyacrylamide (degree of polymerization 400) | C.I. Acid Blue 158 | 100/30 | Isopropyl alcohol, 10.0 | 0 |

After completion of the polymerization reaction and discharge of the polymerization mixture out of the reactor, the amount of the polymer scale deposited on the reactor walls was examined to give the results set out in Table 1. As is clear from the results shown in the table, the amounts of the polymer scale deposition in Experiments No. 4 to No. 10 in accordance with the invention were remarkably small in comparison with Experiments No. 1 to No. 3 where no coating was provided (No. 1) or either one of the components (a) and (b) was omitted No. 2 and No. 3).

EXAMPLE 2

Experiments No. 11 to No. 16)

Aqueous coating solutions were prepared each by dissolving a water-soluble cationic polymer compound as the component (a) and a water-soluble anionic dye as the component (b) of the kinds as indicated in Table 2 below in water. The amounts of the components (a) and (b) in each of the solutions were such that the total concentration of them was about 0.1% by weight, the weight ratio of the component (a) to the component (b) being as indicated in Table 2. In Experiment No. 15, isobutyl alcohol was added to the solution in an amount of 5.0 parts by weight per 100 parts by weight of the aqueous solution containing the components (a) and (b).

The thus prepared aqueous coating solution was applied by spray coating on to the surfaces of the inner walls of a stainless steel polymerization reactor of 120 liter capacity and the stirrer thereof coming into contact with the monomer in a coating amount of about 0.1-1.0 g/m² as dried followed by drying with heating at 90° C. for 10 minutes and thorough washing with water.

Into the thus treated polymerization reactor were introduced 50 kg of styrene monomer, 43.2 kg of deionized water, 120 g of hydroxyapatite, 0.62 g of sodium hydrogensulfite, 125 g of benzoyl peroxide and 25 g of tert-butyl perbenzoate and the polymerization was conducted at 90° C. for 7 hours with agitation.

After completion of the polymerization reaction and discharge of the polymerization mixture out of the reactor, the amount of the polymer scale deposition on the reactor walls was examined to give the results set out in Table 2.

TABLE 2

| Exp. No. | Water-soluble cationic polymer compound [Component (a)] | Water-soluble anionic dye [Component (b)] | (a)/(b) weight ratio | Amount of polymer scale deposition, g/m² |
| --- | --- | --- | --- | --- |
| 11 | None | None | — | 250 |
| 12 | Polyethyleneimine (degree of polymerization 1000) | None | 100/0 | 180 |
| 13 | None | C.I. Acid Black 2 | 0/100 | 200 |
| 14 | Polyethyleneimine (degree of polymerization 1000) | C.I. Acid Black 2 | 100/20 | 3 |
| 15* | Polyethyleneimine (degree of polymerization 1000) | C.I. Acid Black 2 | 100/20 | 1 |
| 16 | polyvinylcarbazole | C.I. Acid Yellow 3 | 100/20 | 2 |

*Isobutyl alcohol added

EXAMPLE 3

Experiments No. 17 to No. 23)

Aqueous coating solutions were prepared each by using a combination of a water-soluble anionic polymer compound as the component (a) and a water-soluble cationic dye as the component (b) of the kinds as indicated in Table 3 below. The weight ratio of the component (a) to the component (b) is given in the table. The total concentration of the components (a) and (b) was about 0.1% by weight in each of the experiments. In Experiments No. 21 and No. 22, an alcohol compound was added to the aqueous solution as indicated in the table. The amount of addition of the alcohol given in parts by weight in the table was per 100 parts by weight of the aqueous solution containing the components (a) and (b).

The thus prepared aqueous coating solution was applied by spray coating on to the surfaces of the inner walls of a polymerization reactor of 100 liter capacity and the stirrer thereof coming into contact with the monomer during the polymerization in a coating amount of 0.1-1.0 g/m² as dried followed by drying with heating at 50° C. for 15 minutes and washing with water.

TABLE 3

| Exp. No. | Water-soluble anionic polymer compound [Component (a)] | Water-soluble cationic dye [Component (b)] | (a)/(b) weight ratio | Alcohol compound, amount of addition in parts by weight | Amount of polymer scale deposition, g/m² |
| --- | --- | --- | --- | --- | --- |
| 17 | None | None | — | None | 1200 |
| 18 | Sodium polyethylenesulfonate | None | 100/0 | None | 1100 |
| 19 | None | C.I. Basic Orange 14 | 0/100 | None | 900 |
| 20 | Sodium polyethylenesulfonate | C.I. Basic Orange 14 | 100/30 | None | 10 |
| 21 | Sodium polyethylenesulfonate | C.I. Basic Orange 14 | 100/30 | Isobutyl alcohol, 5.0 | 5 |
| 22 | Sodium ligninsulfonate | C.I. Basic Blue 1 | 100/30 | Isopropyl alcohol, 10.0 | 3 |
| 23 | Sodium polymethacrylate | C.I. Basic Violet 10 | 100/30 | None | 15 |

Suspension polymerization of vinyl chloride monomer was conducted in the thus treated polymerization reactor in just the same manner as in Example 1. After completion of the polymerization and discharge of the polymerization mixture out of the reactor, the amount of the polymer scale deposited on the reactor walls was examined to give the results set out in Table 3. As is clear from the results shown in the table, the amounts of the polymer scale deposition in Experiments No. 20 to No. 23 in accordance with the invention were remarkably small in comparison with Experiments No. 17 to No. 19 where no coating was provided (No. 17) or either one of the components (a) and (b) was omitted (No. 18 and No. 19).

EXAMPLE 4

(Experiments No. 24 to No. 30)

Aqueous coating solutions were prepared each by dissolving an anionic polymer compound as the component (a) and a cationic dye as the component (b) of the kinds as indicated in Table 4 below in water. The weight ratio of the component (a) to the component (b) in each of the solutions was as given in the table and the total concentration of the components (a) and (b) in the solution was about 0.1% by weight. Then, each of the solutions was admixed with 5 parts by weight of isobutyl alcohol per 100 parts by weight of the solution containing the components (a) and (b).

The thus prepared aqueous coating solution was applied by spray coating on to the surfaces of the inner walls of a stainless steel polymerization reactor of 120 liter capacity and the stirrer thereof coming into contact with the monomer in a coating amount of about 0.1-1.0 g/m² as dried followed by drying with heating at 90° C. for 10 minutes and thorough washing with water.

TABLE 4

| Exp. No. | Water-soluble anionic polymer compound [Component (a)] | Water-soluble cationic dye [Component (b)] | (a)/(b) weight ratio | Amount of polymer scale deposition, g/m² |
|---|---|---|---|---|
| 24 | None | None | — | 280 |
| 25 | Sodium alginate | C.I. Basic Orange 14 | 100/2C | 1 |
| 26 | Sodium polyacrylate (degree of polymerization 800) | C.I. Basic Blue 9 | 100/20 | 1 |
| 27 | Sodium polyethylenesulfonate | C.I. Basic Red 2 | 100/20 | 0 |
| 28 | Sodium polymethacrylate (degree of polymerization 600) | C.I. Basic Yellow 11 | 100/20 | 2 |
| 29 | Sodium chondroitin sulfate | C.I. Basic Violet 14 | 100/20 | 1 |
| 30 | Sodium polyethylenesulfonate | C.I. Basic Orange 14 | 100/20 | 1 |

Polymerization of styrene monomer was conducted in the thus treated polymerization reactor in just the same manner as in Example 2. After completion of the polymerization reaction and discharge of the polymerization mixture out of the reactor, the amount of the polymer scale depostion on the reactor walls was examined to give the results set out in Table 4.

EXAMPLE 5

(Experiments NO. 31 to No. 36)

The inner walls and the stirrer of a stainless steel polymerization reactor of 400 liter capacity were coated with an aqueous coating solution prepared in Experiments No. 5, NO. 7, No. 9, No. 26 or No. 30 of Examples 1 or 4 in a coating amount of about 0.1–1.0 g/m² as dried followed by drying with heating at 50° C. for 30 minutes and thorough washing with water. Into the thus treated polymerization reactor were introduced 100 kg of vinyl chloride monomer, 120 kg of deionized water, 0.1 kg of potassium persulfate, 0.05 kg of disodium phosphate and 1.9 kg of sodium dodecylbenzenesulfonate and the emulsion polymerization of the monomer was carried out at 50° C. for 10 hours with agitation.

After completion of the polymerization, the amount of polymer scale deposition on the reactor walls was examined to give the results set out in Table 5 below.

TABLE 5

| Exp. No. | Aqueous costing solution, prepared in | Amount of polymer scale deposition, g/m² |
|---|---|---|
| 31 | None | 1000 |
| 32 | Experiment No. 5 | 12 |
| 33 | Experiment No. 7 | 2 |
| 34 | Experiment No. 9 | 3 |
| 35 | Experiment No. 26 | 2 |
| 36 | Experiment No. 30 | 2 |

EXAMPLE 6

(Experiments No. 37 to No. 42)

The same polymerization reactor as used in Example 5 was coated with an aqueous coating solution prepared in Experiments No. 6, No. 8, No. 9, No. 28 or No. 30 of Examples 1 or 4 followed by drying and washing with water in the same manner as in Example 5. Into the thus treated polymerization reactor were introduced 98.6 kg of deionized water, 100 kg of vinylidene chloride monomer, 7 kg of acrylonitrile monomer, 0.11 kg of ammonium persulfate, 0.11 kg of sodium hydrogensulfite, 0.64 kg of a polyoxyethylene alkyl ether, 0.05 kg of sodium dodecylbenzenesulfonate and 0.05 kg of acetic acid and emulsion copolymerization of the monomers was carried out at 50° C. for 9 hours with agitation.

After completion of the polymerization, the amount of polymer scale deposition on the reactor walls was examined to give the results set out in Table 6 below.

TABLE 6

| Exp. No. | Aqueous coating solution, prepared in | Amount of polymer scale deposition, g/m² |
|---|---|---|
| 37 | None | 1200 |
| 38 | Experiment No. 6 | 7 |
| 39 | Experiment No. 8 | 2 |
| 40 | Experiment No. 9 | 5 |
| 41 | Experiment No. 28 | 2 |
| 42 | Experiment No. 30 | 1 |

What is claimed is:

1. A method for preventing polymer scale deposition on the walls of a polymerization reactor in the polymerization of an ethylenically unsaturated monomer in an aqueous medium which comprises, prior to the introduction of the monomer, water and other ingredients pertaining in the polymerization into the polymerization reactor, coating the surface of the walls of the polymerization reactor with an aqueous coating solution containing, as dissolved therein, (a) a water-soluble ionic polymer compound and (b) a water-soluble ionic dye having counteractive polarity to the polarity of the said ionic polymer compound and drying the thus coated surface.

2. The method as claimed in claim 1 wherein said water-soluble ionic polymer compound is a water-soluble cationic polymer compound and said water-soluble ionic dye is a water-soluble anionic dye.

3. The method as claimed in claim 1 wherein said water-soluble ionic polymer compound is a water-soluble anionic polymer compound and said water-soluble ionic dye is a water-soluble cationic dye.

4. The method as claimed in claim 1 wherein the aqueous coating solution further contains an aliphatic monovalent alcohol having from 3 to 6 carbon atoms in a molecule.

5. The method as claimed in claim 2 wherein the water-soluble cationic polymer compound is a water-soluble polymer compound having nitrogen atoms positively charged or polarized.

6. The method as claimed in claim 1 wherein the total concentration of the water-soluble ionic polymer compound and the water-soluble ionic dye in the aqueous coating solution is at least 0.01% by weight and the weight ratio of the water-soluble ionic polymer to the water-soluble ionic dye is in the range from 100:5 to 100:100.

7. The method as claimed in claim 1 wherein the coating amount of the surface with the aqueous coating solution is at least 0.001 g/m² as dried.

8. The method as claimed in claim 4 wherein the concentration of the alcohol in the aqueous coating solution is in the range from 1 to 20% by weight.

* * * * *